Feb. 26, 1952      C. M. SMITH      2,587,239

SNAP TYPE CONNECTOR FOR ELECTRICAL WIRES

Filed Aug. 18, 1949

INVENTOR.
CLAY M. SMITH
BY
Lyon r Lyon
ATTORNEYS.

Patented Feb. 26, 1952

2,587,239

UNITED STATES PATENT OFFICE 2,587,239

SNAP TYPE CONNECTOR FOR ELECTRICAL WIRES

Clay M. Smith, Orcutt, Calif.

Application August 18, 1949, Serial No. 110,907

2 Claims. (Cl. 173—340)

This invention relates to wire connectors and more particularly to a device adapted as a bridge connector to connect together two or more insulated wires and replaces the customary twisted wire splices. While the device is of more general application, it is particularly designed for use in connecting paper insulated copper telephone cable wire, wherein the space available for the connection is reduced to a minimum.

While it is above stated that the device is particularly designed for use with copper telephone cable wire, it can be used in various other places such as for connecting electric wires in conduit pole boxes or in fact anywhere, where there is no strain on the wire.

It is a feature of this invention that two insulating members are provided, one adapted to receive the other with spaces or passages being formed to receive the wires desired to be connected together. One of the two cooperating insulating members carries a knife blade or similar device adapted to pierce the insulation of the wires to be connected and form a bridge connection therebetween.

It is another feature of this invention, that the two cooperating insulating members thereof are adapted for a snap connection so that the assembly is quickly and readily assembled in operative condition.

It is a further feature and advantage of this invention, that by means thereof positive electrical connection between two or more wires is readily afforded by a simple snap action and yet the connection remains suitably and adequately insulated.

It is a further advantage of this invention, that the connector avoids twisted wire splices and yet is sturdy, economical and small of size. These and further objects, features and advantages of the invention will be apparent from the annexed specification in which.

In each of the views shown, the parts are enlarged to approximately six times their actual size, in my preferred embodiment of the invention. However, it will be appreciated that size is in nowise critical except in attaining the particular advantage of the small size connector as being able to be used in small places.

Figure 1:
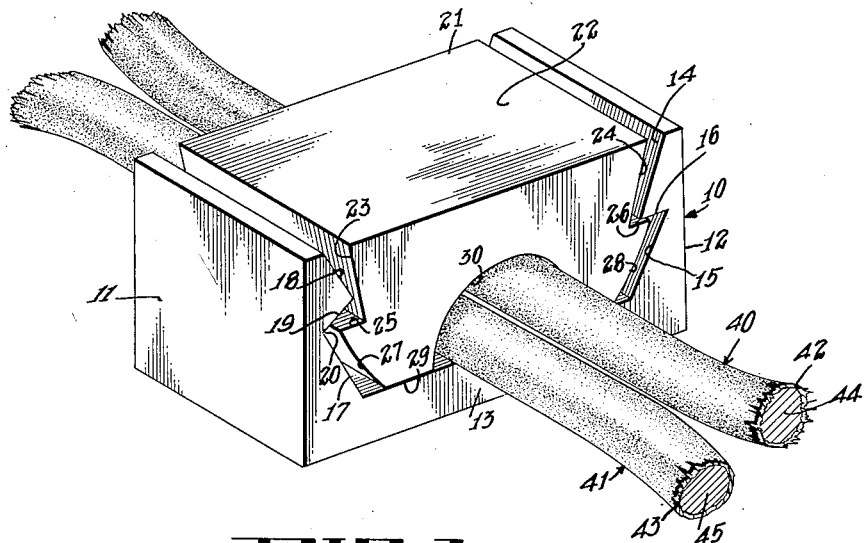
Figure 1 is an enlarged isometric elevation of a device embodying the present invention.

Referring now more particularly to the drawing in Figure 1, I have shown the connector as comprising a female member 10 preferably formed of plastic or other suitable insulating materials such as Bakelite or the like, which member 10 is provided with upstanding side walls 11 and 12 and a base 13 forming a channel therebetween. The channel has sloping walls 14 and 15 upon the inner side of the upstanding wall 12, which form a shoulder 16 thereon.

The other upstanding wall 11 has sloping walls 17 and 18 connected by an oppositely sloping wall 19 forming an angle 20.

Figure 2:
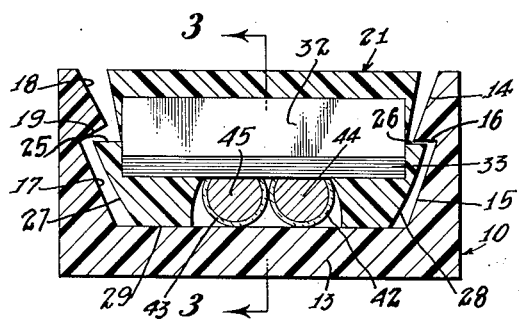
Figure 2 is a vertical section taken midway through the device shown in Figure 1.
Figure 3:
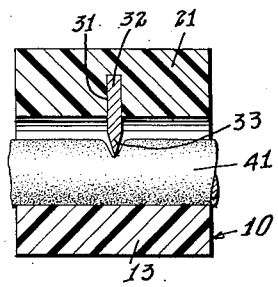
Figure 3 is a section taken along the line 3—3 of Figure 2.

It will be appreciated that the section shown in Figure 2 is uniform throughout the depth of the female member 10. A second or male insulating member 21 is provided, shown in the form illustrated in Figures 1 and 2, and comprising a block of plastic or other suitable insulating member such as Bakelite having a top surface 22, inwardly sloping side walls 23 and 24, shoulders 25 and 26 and inwardly curved or sloping bottom side walls 27 and 28. The block 21 is also provided with a flat bottom portion 29 having throughout its depth a semicircular opening 30 therein. Midway of the block 21 there is formed a slot 31 adapted to receive a knife blade 32 having a knife edge 33. Preferably, the knife blade 32 is formed in the block 21 as the block 21 is cast or molded over the knife blade. Assuming that it is desired to connect a pair of electrical conduit members 40 and 41, these are laid side by side within the semicircular opening 30 and the block 21 is forced into the female member 10.

Sufficient resiliency resides in the upstanding walls 10 and 11 to permit the sloping walls 27 and 28 to pass over the sloping portions 14 and 18 and under the shoulder 16 and the angle 20, with the shoulders 25 and 26 engaged and held therein. As this is done, the knife edge 33 is forced into the conduits 40 and 41 piercing the insulation 42 and 43 and making firm electrical contact with the metallic portions 44 and 45 of the wires.

Figure 4:
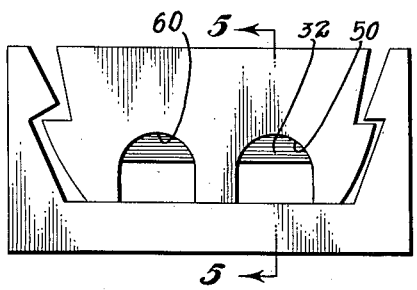
Figure 4 is a side view of an alternative device embodying the present invention.
Figure 5:
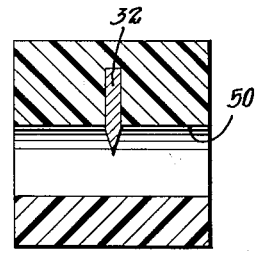
Figures 5 is a section taken along the line 5—5 of Figure 4.

In the embodiment shown in Figures 4 and 5, all of the parts are similarly constructed with the exception that in place of the single semicircular opening 30, shown in Figure 1, there is provided a pair of openings 50 and 60 in the alternative embodiment. It will be appreciated that the use of the alternative embodiment is identical, with the exception that one of the wires 40 will be placed in the opening 50 and the other of the wires 41 will be placed in the opening 60 and the connection therebetween is made by means of the bridge formed by the knife 32.

While there has been described what is at present considered the preferred embodiment of the present invention, it will be appreciated by those skilled in the art that various changes and modifications can be made therein without departing from the essence of the invention and it is intended to cover herein, all such changes and modifications as come within the true spirit and scope of the appended claims.

What is claimed is:

1. An electrical connector comprising: a channel shaped base member, having shoulders formed on its inner side walls, a second member having shoulders formed on its outer side walls and adapted to be received by said first member by a snap connection, each of said members having sloping side walls adjacent its respective shoulders adapted to cooperate to permit flexing of said base member during assembly to permit the shoulders of said second member to snap under the shoulders of said base member, means forming an aperture in one of said members for receiving electrical conduits to be joined and knife means carried by one of said members adapted to pierce and bridge the electric conduits when said members are assembled, each of said members being formed of insulating material.

2. An electrical connector comprising: a channel shaped base member, having shoulders formed on its inner side walls, a second member having shoulders formed on its outer side walls and adapted to be received by said first member by a snap connection, each of said members having sloping side walls adjacent its respective shoulders adapted to cooperate to permit flexing of said base member during assembly to permit the shoulders of said second member to snap under the shoulders of said base member, means forming a plurality of apertures in one of said members for receiving electrical conduits to be joined and knife means carried by one of said members adapted to pierce and bridge the electric conduits when said members are assembled, each of said members being formed of insulating material.

CLAY M. SMITH.

REFERENCES CITED

The following references are of record in the file of this patent:

UNITED STATES PATENTS

| Number | Name | Date |
| --- | --- | --- |
| 1,977,677 | Hill | Oct. 23, 1934 |
| 2,078,825 | Wisner | Apr. 27, 1937 |
| 2,164,381 | Bradley | July 4, 1939 |

FOREIGN PATENTS

| Number | Country | Date |
| --- | --- | --- |
| 575,494 | England | Mar. 1, 1945 |